Patented Jan. 26, 1932

1,843,060

UNITED STATES PATENT OFFICE

EDGAR ARTHUR ASHCROFT, OF WAYE HOUSE, NEAR ASHBURTON, ENGLAND

METALLURGY OF ORES OR MATERIALS CONTAINING TIN

No Drawing. Application filed May 8, 1928, Serial No. 276,200, and in Great Britain April 5, 1928.

This invention relates to improvements in the metallurgy of tin bearing ores or materials whereby the valuable contents thereof may be extracted in a more convenient and economical manner than heretofore.

It is useful in the treatment of ores, concentrates, slags residues or tin containing materails of almost any kind.

In my co-pending applications, Serial No. 275,267, patented December 23, 1930, No. 1,786,386, and Serial No. 275,560, patented October 28, 1930, No. 1,780,106, and Serial No. 275,971, patented August 4, 1931, No. 1,817,865, I have described inventions having similar objects to this one.

My present invention is intended both for use in conjunction with those said inventions or any of them or independently thereof in any useful connection.

It is characterized by the use of the chloride of the volatile alkali ammonia to effect the chlorination of the metals contained in such materials as aforesaid containing tin. I may effect the chlorination of the tin in such materials directly from the said ammonium chloride or indirectly by the medium of another metal e. g. iron which will receive and hold the chlorine at the temperature appropriate to the decomposition without volatilization of the ammonium chloride and will thereafter at a somewhat higher temperature impart the said chlorine to the tin all as hereinafter explained.

It is further characterized by the employment of the produced ammonia—with or without carbonic acid or sulphur compounds—to precipitate the said metals from their solutions in water, as oxides or carbonate, sulphides or like salts and the subsequent treatment of such salts with the object of winning the desired products—for instance tin—in the desired forms and separately from unwanted impurities—and regenerating the ammonium chloride.

My invention is further characterized by the employment of any suitable metal or alloys or admixtures of two or more metals as reducing agents in conjunction with the said chlorination by the agency of ammonium chloride and by the reduction of cassiterite or other refractory oxides by the agency of the nascent hydrogen produced in such reaction as hereinafter explained.

In carrying my invention into effect I place mixtures of the aforesaid tin bearing ores or materials with ammonium chloride in any suitable heating apparatus for instance a retort and gently and uniformly heat the mixture until all the ammonia is driven off and chlorides of the metals in the charge remain.

The desired temperature should be reached uniformly and gently and should not exceed 350° to 400° centigrade until all the ammonia has been expelled by reason of the fact that at about 350° centigrade ammonium chloride sublime without decomposition and if heat is applied too quickly so that this temperature is exceeded before reaction is sufficiently advanced the remaining salt sublimes out of the sphere of reaction and is deposited on the nearest cooler surfaces of the retort or outlets.

Outlets and means of collection are provided for the expelled ammonia water, and/or hydrogen gas or gaseous sulphur compounds.

It is important for economic reasons to avoid any overheating of the effluent ammonia as this gas is destroyed on coming into contact with too hot surfaces. After the ammonia has been all expelled and collected I may if desirable raise the temperature to 600° centigrade or higher when the produced iron chloride and iron—if any—will react to form stannous chloride with any remaining tin compounds present. On further raising the temperature to 620° to 700° centigrade the stannous chloride will distil over in a very pure state and may be so collected as described in my Patent No. 1,817,865.

After the aforesaid heat treatment I may lixiviate the heated charges with water, extract the soluble salts and treat the solutions in any known or suitable ways whereby the recovered ammonia is employed with or without the agency of carbonic acid to precipate the metals of the soluble salts as oxides hydroxides carbonates or sulphides from the said solutions separately or in any suitable combinations and the ammonium chloride first employed is regenerated quantitatively thus forming a cyclic process.

Tin is readily precipitated and recovered as stannous hydrate by means of ammonia or as hydrated stannous sulphide by ammonium sulphide or hydro-sulphide and the other metals may be precipitated and recovered in known or suitable ways.

As the basis of the herein described invention four distinct but allied and typical reactions come into play separately or in various combinations:

The first or (A) reaction relates to the chlorination of metals from their oxides silicates or the like—other than cassiterite (which is not acted upon directly by ammonium chloride at 350° centigrade or less) and may be empirically written thus.

(A) $MO + 2NH_4Cl = MCl_2 + H_2O + 2NH_3$ where M represents any metal present in the form of an oxide or a decomposable silicate for instance SnO, CaO, FeO &c., and the lower silicates thereof such as may be contained in slags.

The second or (B) reaction relates to the chlorination of metals alone or contained in various alloys or admixtures for instance in iron powders or in the nickel-tin or nickel-iron-tin alloys used or produced as described in my Patent No. 1,780,106 and Patent No. 1,817,865 or in secondary metals containing tin. This reaction may be empirically written.

(B) $M + 2NH_4Cl = MCl_2 + 2NH_3 + H_2$ where M represents any of the aforesaid metals for instance Sn, Fe, Ni or the like which it may be desired to chlorinate either alone or in various alloys or admixtures or waste or secondary products containing tin.

The metals so acted upon should as far as possible be pulverized or otherwise comminuted.

The third (C) reaction relates to the combined chlorination of metals as in (B) and the simultaneous reduction and chlorination of tin contained in cassiterite. This reaction may be written thus:

(C) $M + SnO_2 + 4NH_4Cl = MCl_2 + SnCl_2 + 4NH_3 + 2H_2O$ where M represents any of the metals (including tin) which may be used alone or in alloy or admixture with the object of simultaneously reducing cassiterite and chlorinating the tin content thereof together with all the metals used alone or in any alloy or admixture as aforesaid. The latter reaction is seldom complete as written but is usually a combination of reactions (B) and (C) whereby a part of the nacent hydrogen evolved in the decomposition of ammonium chloride—in (B)—is employed as indicated in (C) in the reduction of cassiterite and a part escapes as normal hydrogen. The degree of completeness of these two reactions will depend mainly on the nature of the metal or alloy of metals employed as hereinafter explained.

The fourth or (D) reaction comes into play alone or together with either of the other three reactions when treating materials containing any considerable proportion of metallic sulphides as for instance the complex ores found in some Bolivian mines containing zinc and lead as sulphides and tin both as cassiterite and as sulphostannates of the other metals. It may be empirically written thus:—

(D) $MS + SnO_2 + Fe + 4NH_4Cl = FeO + MCl_2 + SnCl_2 + NH_4HS + H_2O + 3NH_3$ where M stands for any divalent metal including tin which may be present in the ore.

The sulphides and tin oxide need not necessarily be in the above proportions and the amount and nature of the ammonium sulphur compounds evolved will vary with such varying proportions. But whatever these proportions may be the sulphur ammonium compounds as likewise the free ammonia or ammonium carbonates if present in the effluent gases may all be collected and used in the precipitation of the several metals as aforesaid in known or suitable ways and the equivalent of ammonium chloride is regenerated thereby so that the process may be worked cyclically as aforesaid if desired.

I may employ any of these reactions combined or separately or any allied or analogous reactions—without departing from my invention. I prefer to pulverize to about 100 mesh and intimately mix—and when practicable to grind together—the ingredients of charges according to the aforesaid reactions before the heat treatment.

The said ingredients may be proportioned according to the chemical equivalents of the reagents and of the reacting parts of the materials under treatment with some excess of reagents when required. For instance in slags or ores containing free calcium or magnesium compounds excess ammonium chloride will be required to supply those elements with chlorine converting them to water soluble chlorides, the chlorine content of which is afterwards again caused to combine with the equivalent of ammonia in known ways as for instance by precipitating the metals with ammonia and carbonic acid. Excess ammonium chloride may also be required due to the formation of double salts of ammonium chloride and of the various metal chlorides. Such excess is afterwards fully recovered from the solutions.

The most suitable proportions for charges may be readily found by confirmatory trials on a small scale and after calculation in each case.

On first applying heat to the charges in the retorts for instance at about 200 to 250 degrees centigrade double salts of ammonium chloride with some of the metals of the said charges are formed with liberation of about half the ammonia and at a higher temperature e. g. 350 to 600 degrees centigrade these double salts for the most part break up and further chlorination of the metals takes place with liberation of the remaining ammonia.

As examples of methods of carrying out my invention I cite the following but I do not limit myself to these examples.

Example No. 1

It is desired to treat materials containing tin—with or without other metals—as oxides (other than cassiterite) such as various residues or as the tin silicates contained in slags or as stannates of other metals as are contained in various known complex ores which are for the most part untreatable by hitherto known means.

The material is mixed with a considerable excess of ammonium chloride calculated to about double the molecular equivalent of all the metals present which it is desired to chlorinate. Or a less quantity of ammonium chloride may be used when it is intended to raise the temperature after liberation of the ammonia so that the produced iron chloride and the iron—if any—present after the first reaction may react to form stannous chloride and iron oxide, as hereinbefore and after described.

The mixture pulverized and well mixed is placed in a retort of enamelled iron or of any suitable and sufficiently refractory material metallic or otherwise and heated gently and uniformly to 300° to 350° centigrade taking as long as may be necessary for complete reaction to the desired degree and without subliming of ammonium chloride out of the sphere of reaction.

The reaction takes place according to reaction (A) hereinbefore described and 2 molecular parts of ammonia and one of water are liberated for each molecular part of any of the divalent metals which are thus chlorinated.

After the ammonia has all been liberated the temperature may be raised if desired for further reaction as hereinbefore explained or the heat may be stopped at the lower temperature. When present in considerable amounts stannous chloride may be caused to distil off—and be collected—on raising the temperature above 620° centigrade.

In any case the charge after treatment may be lixiviated with water or with any preferred solvent and the resulting solutions and any sublimed stannous chloride may be treated in any known or suitable way—as for instance by the agency of the liberated ammonia with or without carbonic acid or sulphur ammonium compounds—for recovery of the metals separately or together as oxides, hydroxides, carbonates, sulphides or like salts hereof and the regeneration of the ammonium chloride.

Example No. 2

It is desired to treat materials of a metallic nature containing tin with or without other metals for instance reduced tin pellets obtained by reduction of cassiterite at nonslagging temperatures or alloys of iron and tin known as hard-head or secondary metal alloys or any of the alloys which are formed according to the process described in my copending application Serial No. 275,560, containing tin and nickel with or without iron.

In such cases reaction takes place according to reaction (B) hereinbefore explained the procedure is the same in all respects as in Example No. 1 but hydrogen gas in considerable amounts is liberated with the ammonia and may be caught and put to any useful purposes.

Example No. 3

It is desired to treat any of the materials enumerated under Example No. 2 but at the same time to make use of the reducing power of the nascent hydrogen produced in the chlorination of the metallic substances—including the tin present as metal—to reduce and simultaneously chlorinate other tin contained in cassiterite.

The reaction takes place partially according to reaction (C) and partially according to reaction (B) as hereinbefore described.

The procedure may be the same as in Example No. 2 with the addition of the cassiterite bearing material which is pulverized and intimately mixed with the charges in any desired proportions.

This material may be used quantitatively or in excess.

The incompletely chlorinated residues containing tin may be returned again and again to the next charges with additional metal and ammonium chloride for further reaction until no tin is left. Gangue matter may if desired be removed therefrom by mechanical concentration before retreatment at any preferred stage of the treatment.

Example No. 4

It is desired to treat a complex sulphide ore such as may contain for instance 4 per cent or more tin as cassiterite 1 per cent or more as sulpho stannate of lead and about five per cent of lead and 20 per cent zinc and some iron all as sulphides.

The ingredients of the charges for this ore may be mixed according to reaction (D) and the procedure is otherwise the same as in the previously cited examples. The residues from treated charges if extraction is not complete may be retreated as often as may be necessary after adding more Fe as powder and more ammonium chloride. If desired gangue matter may be removed or partially removed by concentration methods before retreatment.

The ammonia sulphur compounds may be used to precipitate metals as sulphides or utilized in any known or suitable way.

If preferred such ores may be roasted before treatment. But roasting is by no means essential and may even occasion losses of tin.

*Example No. 5*

My invention is also useful for the treatment of the residues or sludges which result from purifying lead bullion containing tin, antimony and arsenic in known ways by treating them with caustic soda. These residues contain stannates, antimonates, and arsenates of soda, and free caustic, and carbonate of soda.

To treat such residues I proceed as in Example No. 1, calculating the ammonium chloride so as to satisfy all the metals including the sodium with their equivalents of chlorine. The mixture is placed in the aforesaid retorts and gently heated and the chlorides are dissolved to a mixed solution in water.

After precipitating by suitable means using the evolved ammonia with or without carbonic acid—I may recover the sodium also as bicarbonate and the equivalent of ammonium chloride by treating the remaining salt solution with ammonia gas and carbonic acid after the well known ammonia soda reaction. Insoluble bicarbonate of soda is precipitated and ammonium chloride goes into solution whence it may be recovered after removing and collecting the aforesaid sodium bicarbonate.

Throughout this specification the terms ore or material are intended whenever applicable by the context to include any ore concentrate product slag residue or other material from which tin is to be extracted. The terms furnace or retort are intended to include retorts horizontal sloping or vertical muffle or open furnaces with or without rabbling device, revolving furnaces kilns tunnel ovens or any form of heating apparatus the heat for which may be supplied by solid liquid or gaseous fuel or by electricity.

I do not confine my invention to the precise quantities or proportions of ingredients which I have indicated by way of example or illustration but may vary the same in any suitable manner and to suit any particular case without departing from the fundamental principles of my invention.

What I claim is:—

1. The method of recovering tin from tin-bearing materials mixed with iron, comprising subjecting the material to a gentle heating between 350 and 400° Centigrade approximately in the presence of ammonium chloride to produce metal chlorides and ammonia, subsequently raising the temperature to substantially 600° centigrade to cause the iron chloride which has been produced to react with any residual tin to form tin chloride, and raising the temperature further to 620° centigrade or more to remove tin chloride from the resulting mixture and recovering the ammonia produced in the process and returning it as a reagent for use as the process is repeated.

2. The process for recovering tin from tin-bearing materials mixed with iron, comprising subjecting the material to a gentle heating between 350 and 400° centigrade approximately in the presence of ammonium chloride to produce metal chlorides and ammonia, subsequently raising the temperature to substantially 600° centigrade to cause the iron chloride which has been produced to react with any residual tin to form tin chloride and volatilizing tin chloride from the resulting mixture.

3. A method of treating tin containing materials comprising the steps of producing ammonia and volatile chlorides of the metals contained in the materials by heating the material in the presence of ammonium chloride at a temperature of between 350° to 400° C., lixiviating the heated charges with water, extracting the soluble salts, and precipitating the metals of the soluble salts with the recovered ammonia.

In testimony whereof I have signed my name to this specification.

EDGAR ARTHUR ASHCROFT.